(12) United States Patent
Buchanan (10) Patent No.: US 6,653,748 B2
(45) Date of Patent: *Nov. 25, 2003

(54) SYSTEM AND METHOD FOR CONTROLLING AN OUTPUT SIGNAL OF A POWER SUPPLY

(75) Inventor: Marlowe James Buchanan, Lake Oswego, OR (US)

(73) Assignee: Alcatel Canada Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/298,049

(22) Filed: Nov. 18, 2002

(65) Prior Publication Data

US 2003/0067223 A1 Apr. 10, 2003

Related U.S. Application Data

(63) Continuation of application No. 09/802,863, filed on Mar. 12, 2001, now Pat. No. 6,507,129.

(51) Int. Cl.⁷ .................................................. H02J 1/10
(52) U.S. Cl. .............................. 307/51; 307/80; 307/64
(58) Field of Search ............................... 307/51, 62, 60, 307/69, 80, 81, 64, 85, 86

(56) References Cited

U.S. PATENT DOCUMENTS

| | | | | |
|---|---|---|---|---|
| 3,912,940 A | * | 10/1975 | Vince | 307/64 |
| 3,946,375 A | * | 3/1976 | Bishop et al. | 340/635 |
| 4,728,807 A | * | 3/1988 | Harafuji et al. | 307/52 |
| 5,428,524 A | * | 6/1995 | Massie | 363/79 |
| 5,550,461 A | * | 8/1996 | Pouzoullic | 323/269 |
| 5,557,738 A | * | 9/1996 | Townsley et al. | 714/14 |
| 5,659,208 A | * | 8/1997 | Kimble et al. | 307/82 |
| 5,672,958 A | * | 9/1997 | Brown et al. | 323/269 |
| 5,949,667 A | * | 9/1999 | Libert | 363/65 |

\* cited by examiner

Primary Examiner—Shawn Riley
(74) Attorney, Agent, or Firm—Blake, Cassels & Graydon LLP (57) ABSTRACT

A control system for selectively isolating a power supply from a common bus is provided. The control system comprises a connection to an output path of an output signal of the power supply and a resistive element providing a variable resistance between an input terminal and an output terminal. The input terminal is connected to the connection and the output terminal is connected to the common bus. The resistive element further comprises a control terminal allowing adjustment of the variable resistance. A control element provides a control signal to the control terminal; the control element is responsive to current flowing between the output path and the common bus.

18 Claims, 7 Drawing Sheets

FIG. 1

Prior Art

SYSTEM AND METHOD FOR CONTROLLING AN OUTPUT SIGNAL OF A POWER SUPPLY

This application is a continuation of U.S. patent application Ser. No. 09/802,863 now issued under U.S. Pat. No. 6,507,129.

FIELD OF THE INVENTION

The invention relates generally to control circuitry for a power supply, in particular reverse current control circuits for a power supply.

BACKGROUND OF THE INVENTION

A fault tolerant redundant power system comprises a plurality of local power supplies which individually provide their outputs to a common bus. The power signal on the common bus is provided to a device, which appears as an electrical load.

To make the power system fault tolerant, isolation circuitry is often provided at each local power supply which isolates it from the rest of the system in the event of its failure.

Often, the isolation circuitry comprises an OR-ing or blocking diode which connects the output of the local power supply to the common bus. A forward biased blocking diode enables current to flow from the local power supply to the common bus, but blocks reverse current flow therethrough. Accordingly, if the local power supply fails, the blocking action of the diode ensures that the failure does not enable current to flow from the common bus into the circuitry of the failed local power supply.

When a diode is forward biased, there is a significant voltage drop across its junction. The energy lost as current flows through the voltage drop is converted into heat. When output current is in the range of tens to hundreds of amperes ("amps"), heat generated within a diode can be significant and detrimental to surrounding circuits. Though the use of diodes increase system fault tolerance and reliability, the heat associated with them has a negative effect on system MTBF (mean time between failure).

Other isolation circuitry may utilize an enhanced field-effect transistor (a MOSFET, or FET) and a control circuit instead of a diode. In the most typical case of a positive output voltage and an N-channel FET, the output of the local power supply is connected to the source of the FET; the drain of the FET is connected to the common bus; the gate of the FET is connected to the control circuit. When $V_{gs}$, the voltage drop between the gate and source, is lower than the threshold voltage, the FET is OFF and it prevents reverse current flowing into the local power supply. When $V_{gs}$ is sufficiently higher than the threshold voltage, the FET is ON and will support current flow in either direction.

Traditionally, the control circuit for the FET generated a $V_{gs}$ having sufficient voltage to cause the FET to operate in saturation during normal power supply operation for significant output current, and $V_{gs}$ would be dropped below the threshold voltage if a condition that would result in reverse current flow were detected. By driving the FET either into saturation or cut-off, the device is operated like a bipolar ON/OFF switch; operation in the linear region is strictly avoided.

$V_{sd}$, the voltage drop between the source and the drain of a FET, may be used to indicate the magnitude and direction of current flowing between the local power supply and the common bus. However, by using a FET which operates only in either its cut-off region or its saturated region, it is difficult to detect and react to a fault condition present between the power supply and the common bus. In a fault condition, the net output current from the power supply typically approaches zero then goes rapidly negative. The saturated ON resistance ($R_{ds-on}$) of a selected FET chosen to handle high output currents will typically be in milliohms, making the difference between a proper small output current and an improper reverse current in the order of millivolts. It may be difficult to detect the fault condition using current values and voltage values in that range. Further, obtaining a larger voltage signal using a FET having a higher $R_{ds-on}$ or a fixed sensing resistor generates more heat under high load conditions.

It is desirable to have isolation circuitry for a power supply which improves upon the characteristics of known blocking systems.

SUMMARY OF INVENTION

In a first aspect, a control system for selectively isolating a power supply from a common bus upon detection of an improper current flow between the common bus and the power supply is provided. The control system comprises a resistive element and a control element. The resistive element provides variable resistance between an input terminal and an output terminal. The variable resistance has at least three resistive values. The input terminal is connected to an output path of an output signal of the power supply and the output terminal is connected to the common bus. The resistive element also has a control terminal enabling adjustment of the variable resistance. The control element provides a control signal to the control terminal and the control element is responsive to a value of a current flowing between the output path and the common bus. The control element generates the control signal to cause the variable resistance to be set at one of the resistance values to impede flow of the current, depending on the value of the current.

The control element may utilize a first voltage signal associated with the input terminal and a second voltage signal associated with the output terminal when providing the control signal.

The control system may have the resistive element blocking the current flowing from the common bus to the output path.

The control system may have the resistive element being a FET which is controlled by the control element to operate in a linear region when the current is both flowing from the output path to the common bus and decreasing in value.

The control system may have the control element adjusting the control signal to increase the variable resistance, if possible, when there is a decrease in the current flowing from the output path to the common bus. Further, the control system may have the control element adjusting the control signal to decrease the variable resistance, if possible, when there is an increase in the current flowing from the output path to the common bus. The control system may have the control element adjusting the control signal to operate the FET in a cut-off region when the first voltage is smaller than the second voltage. Also, the control system may have the control element being an operational amplifier. The control system may have the control signal amplified by an intermediary circuit located between the operational amplifier and the control terminal.

The control system may have the resistive element being selected from a group comprising a MOSFET, a BJT, a JFET and an IGBT. Further, the control system may have the control element being an operational amplifier. The amplifier may adjust the control signal: (i) to increase the variable resistance, if possible, when the current flows from the output path to the common bus and the current decreases; (ii) to decrease the variable resistance, if possible, when the current flows from the output path to the common bus and the current increases; and (iii) to operate the resistive element in a cut-off region when the first voltage is smaller than the second voltage.

The control system may have the operational amplifier utilizing a first voltage signal from the output path and a second voltage signal from the common bus to generate the control signal.

The control system may further have a thermal protection circuit associated with the resistive element. The thermal protection circuit may detect when excessive heat is generated by the resistive element and then control the power supply to reduce the excessive heat.

For the control system the thermal protection circuit may comprise a thermal sensor and a shutdown latch.

Alternatively, the control element may utilize digitized signals to process measurements associated with the current. Also, the control element may be selected from a group comprising a microcontroller, a microprocessor and a controller controlled by a microprocessor.

In a second aspect, a power supply system for use with a common bus providing power to a load is provided. The power supply system comprises a power supply producing an output signal on an output path, a resistive element providing a variable resistance between an input terminal and an output terminal and a control element providing a control signal to the control terminal. The resistive element further has a control terminal enabling adjustment of the variable resistance. The variable resistance has at least three resistance values. The input terminal is connected to the output path; the output terminal is connected to the common bus. The control element is responsive to a current flowing between the output path and the common bus.

The power supply system may have the resistive element selected from a group comprising a MOSFET, a BJT, a JFET and an IGBT. The control element may be an operational amplifier. The operational amplifier may utilize a first voltage signal associated with the input terminal and a second voltage signal associated with the output terminal in providing the control signal. The control signal may be a function of the first voltage signal and the second voltage signal. The operational amplifier may adjust the control signal to: (i) increase the variable resistance, if possible, when the current flows from the output path to the common bus and the current decreases; (ii) decrease the variable resistance, if possible, when the current flows from the output path to the common bus and the current increases; and (iii) operate the resistive element in a cut-off region when the first voltage is smaller than the second voltage.

In a third aspect, a method for selectively isolating a power supply from a common bus is provided. The method comprises: (i) determining direction and magnitude of current flowing between an output path of the power supply and the common bus; (ii) increasing a resistance value of a resistive element located between the output path and the common bus, if possible, when the current flows from the output path to the common bus and the current decreases; (iii) decreasing the resistance value, if possible, when the current flows from the output path and the current increases; and (iii) blocking the current from flowing from the common bus to the output path. The resistance value may be selected from one of at least three resistance values.

The method may have the resistive element selected from a group comprising a MOSFET, BJT, a JFET, and an IGBT. Further, the resistive element may operate in a linear region when both the current is flowing from the output path to the common bus and the current is decreasing.

In other various aspects, the invention comprise various combinations and subsets of the aspects described above.

BRIEF DESCRIPTION OF THE DRAWINGS

The foregoing and other aspects of the invention will become more apparent from the following description of specific embodiments thereof and the accompanying drawings which illustrate, by way of example only, the principles of the invention. In the drawings, where like elements feature like reference numerals (and wherein individual elements bear unique alphabetical suffixes).

DETAILED DESCRIPTION OF EMBODIMENTS

The description which follows, and the embodiments described therein, are provided by way of illustration of an example, or examples, of particular embodiments of the principles of the present invention. These examples are provided for the purposes of explanation, and not limitation, of those principles and of the invention. In the description which follows, like parts are marked throughout the specification and the drawings with the same respective reference numerals.

Figure 1:
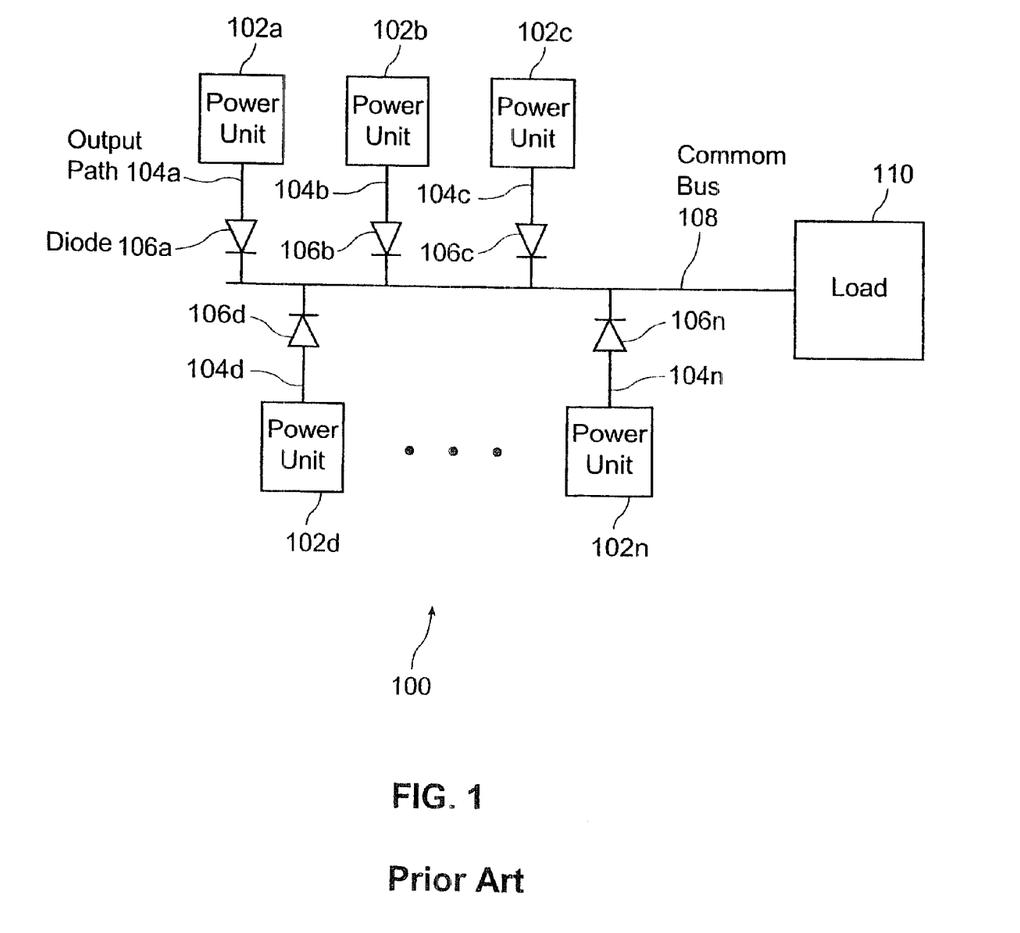
FIG. 1 is a block diagram of a prior art power supply system.

Referring to FIG. 1, prior art power system 100 is shown. Power system 100 comprises power supply units 102a, 102b, 102c, 102d, ... 102n. Each power supply 102 has an output path 104a, 104b, 104c, 104d, ... 104n. Each power supply 102 provides positive voltage and current per design requirements to common bus 108 of the power system 100. For example, each power supply unit 102 may provide 5 volts at 50 amps onto the common bus 108. An electrical device is connected to the common bus and appears as load 110 to power system 100. It will be appreciated that common bus 108 may be considered to be node 108 and output path 104a may be considered to be node 104a.

For each power supply 102, its output path 104 passes through a diode 106 which operates to prevent reverse flow of current from common bus 108 to output path 104. The anode of diode 106 is connected to output path 104; the cathode is connected to the common bus 108. Accordingly, if a power supply fails, then the current flowing on bus 108 will not be diverted from load 110 into a circuit of the power supply 102 via its output path 104.

Figure 2:
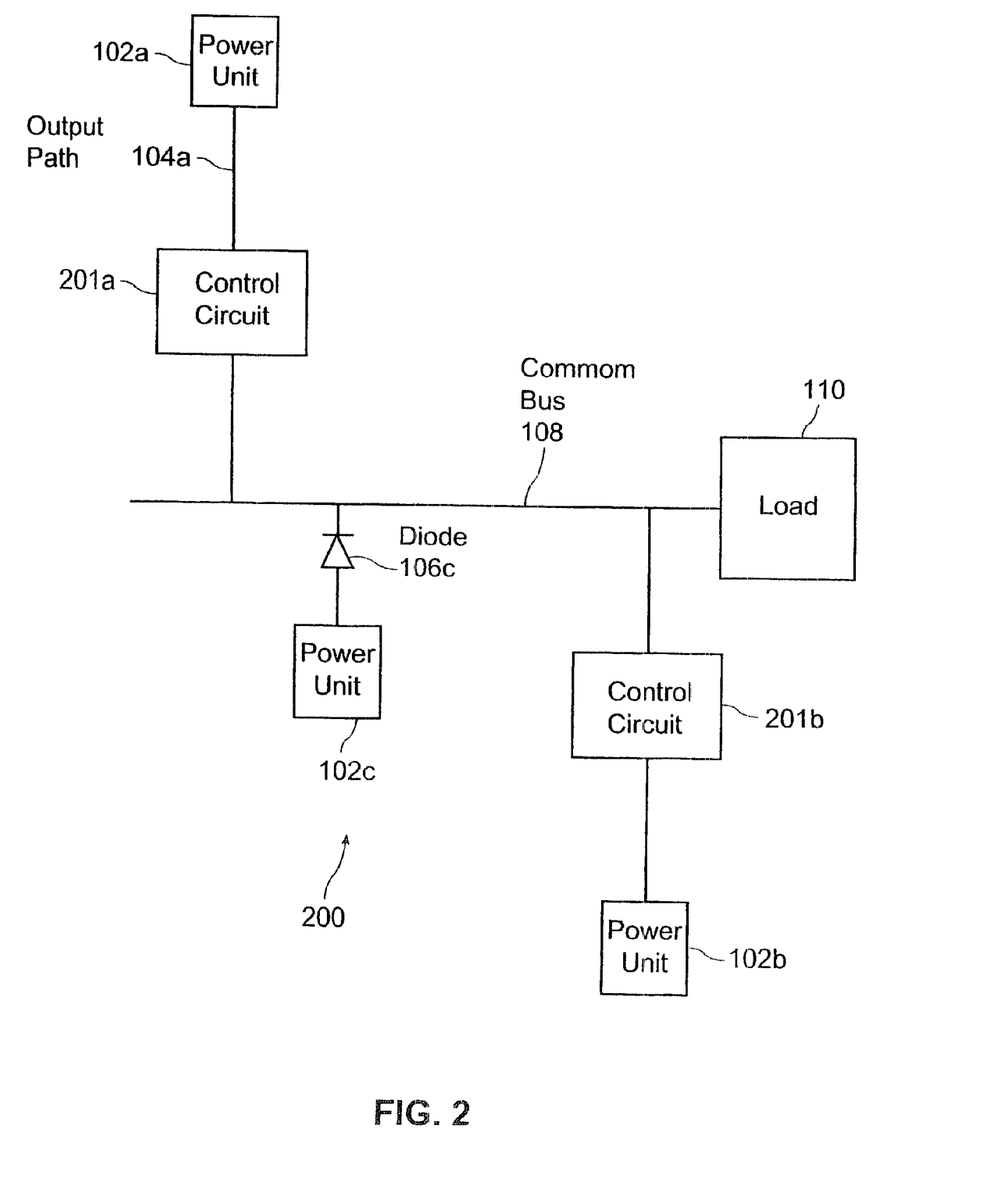
FIG. 2 is a block diagram of a power supply system incorporating a power supply utilizing a first and second embodiment of the invention.

Referring to FIG. 2, a block diagram of two embodiments in use is shown in power system 200. Again, power supply 102a produces an output which is provided to output path 104a. Load 110 receives the cumulative current from power supply 102a and other power supplies 102. Control circuit 201a provides a functionally equivalent arrangement to diode 106a to block reverse current flowing from common bus 108 to power supply 102a and to allow current to flow from output path 104a to common bus 108. Control circuit 201b provides another embodiment of a functionally equivalent blocking arrangement mechanism to diode 106a. Further details on circuits 201a and 201b are provided below in separate sections. It can be appreciated that other power supplies 102c, 102d, etc. may utilize either diode 106 or control circuit 201 to individually prevent reverse current flowing into their outputs.

Figure 3:
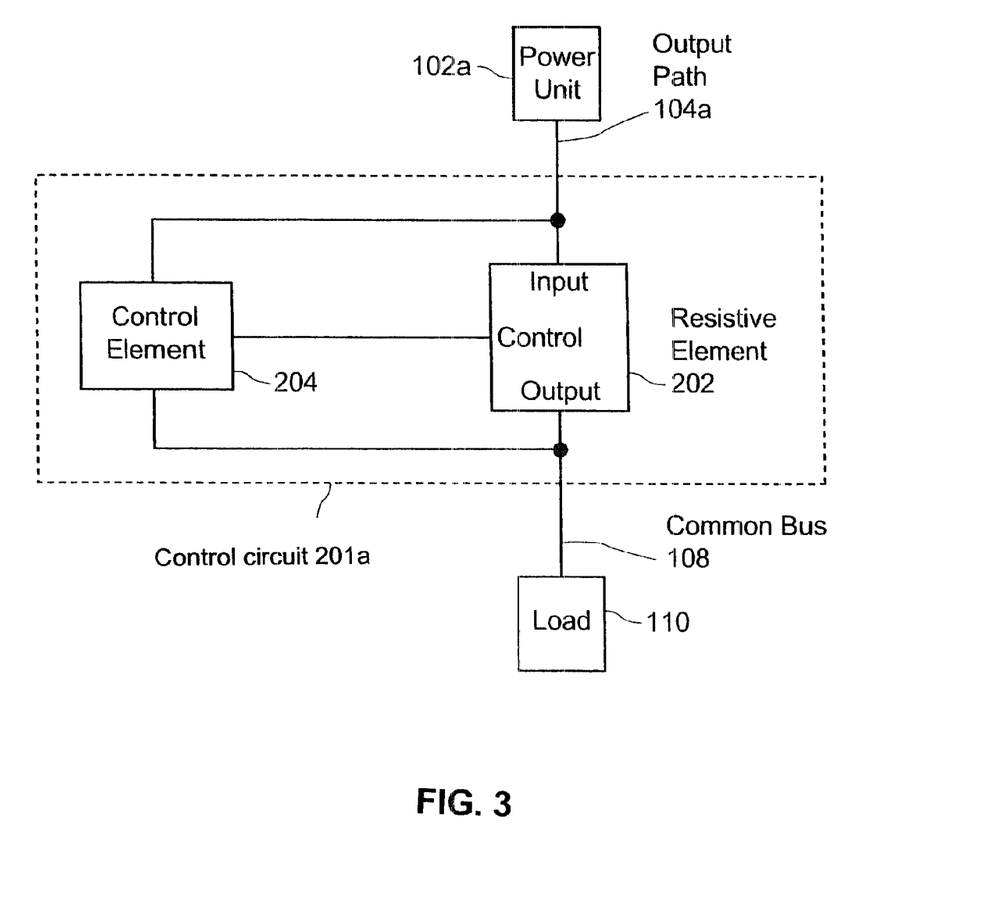
FIG. 3 is a block diagram of a control circuit of an embodiment shown in FIG. 2.

Referring to FIG. 3, general elements of circuit 201 of an embodiment are shown. The main components of circuit 201a, which is an embodiment of control circuit 201, are resistive element 202 and control element 204. Resistive element 202 is located between local power supply output 104a and common bus 108. Resistive element 202 has a variable electrical resistance. It is a three terminal device, comprising an input terminal, an output terminal and a control terminal. Resistance between the input terminal and the output terminal is varied by control signals provided to the control terminal. When there is forward current flow (local power supply 102a to common bus 108), an appropriate control signal is provided to the control terminal to adjust resistance to be small, thereby providing less resistance to forward current flow. When conditions exist that could support reverse current flow (current flowing from common bus 108 to power supply 102a), a control signal is provided to the control terminal to adjust resistance to be extremely high. Such conditions include: failure of the power supply 102a, excessive voltage on common bus 108 or hot swapping of power supply 102a into common bus 108. Control element 204 has inputs connecting to output 104a and common bus 108 and a control output that connects to control terminal 310 (shown in FIG. 4).

It will be appreciated that in other embodiments a plurality of resistive elements 202 may be provided in parallel, in series or in a combination of both between common bus 108 and output path 104a.

It will be appreciated that in other embodiments resistive element 202 may have a plurality of control terminals.

The control output signal generated by control element 204 may vary depending on the technology of device selected as resistive element 202. Generally, the output control signal will comprise the form:

$K*$(voltage at node 104a—voltage at node 108),    Equation 1 where K is a constant value. It will be appreciated that K may be a function. Accordingly, control element 204 selectively isolates power supply 102a from common bus 108, depending on the value of its control signal.

It will be appreciated that the conditions which support reverse current flow may be detected by comparing the voltage at the input terminal with the voltage at the output terminal. When the voltage at the input terminal is less than the voltage at the output terminal, there may be reverse current flow.

Figure 4:
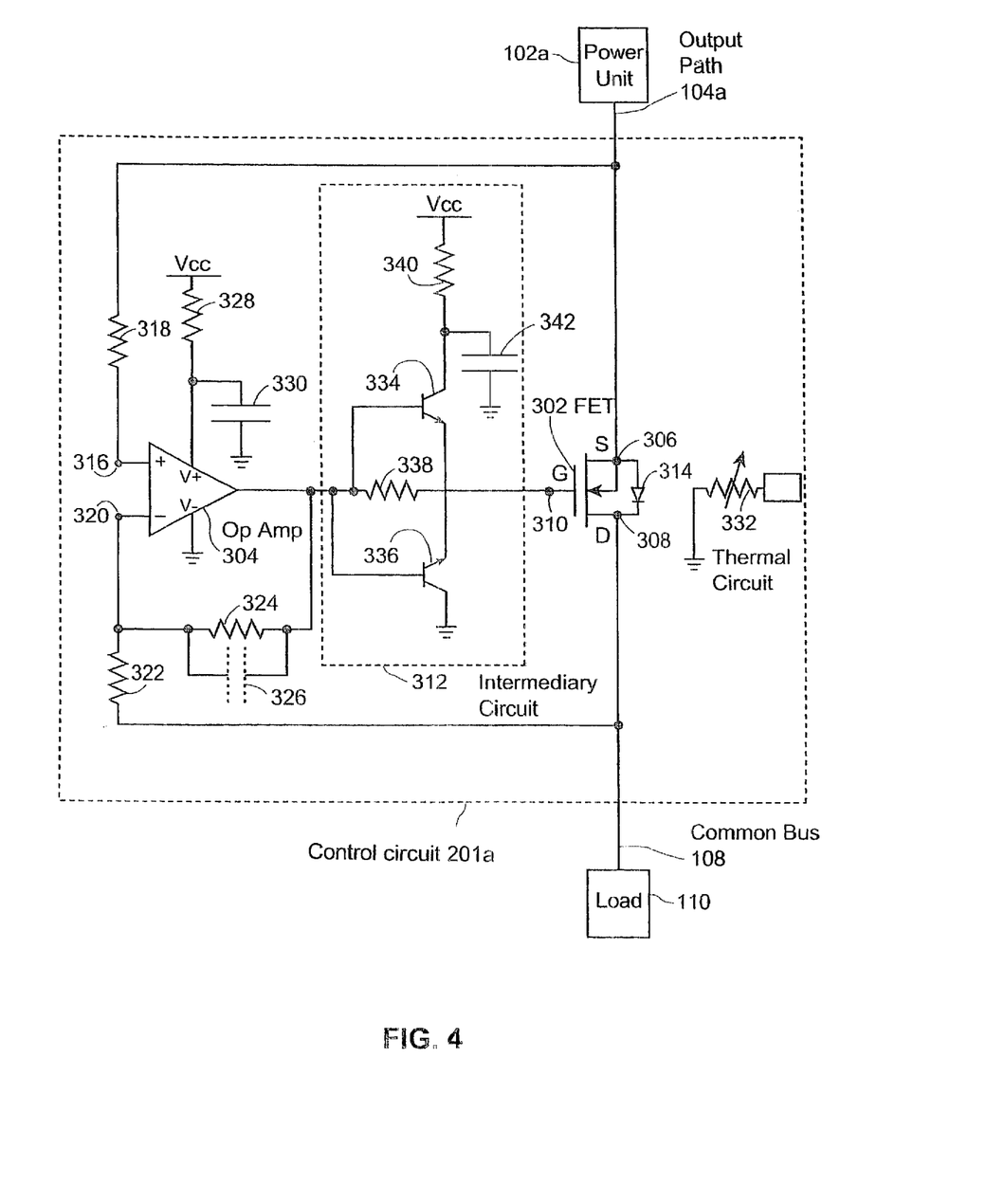
FIG. 4 is a block diagram of the first embodiment using a FET of the control circuit shown in FIG. 2.

Referring to FIG. 4, elements of circuit 201a (a first embodiment of circuit 201) are shown in detail. The main components of circuit 201a are resistive element 302 (corresponding to element 202) and control element 304 (corresponding to element 204). Resistive element 302 is connected to output 104a and common bus 108. Resistive element provides a variable resistance between nodes 104a and 108. Control element 304 controls the resistance shown by resistive element 302 to circuit 201a by providing an appropriate control signal to resistance element 302. Accordingly, control element 304 can cause reverse current flow to be impeded from flowing into the power supply 102 by setting the resistance value to be extremely high.

In the first embodiment, resistive element 302 is an N-channel MOSFET ("FET") such as STV160NF02L available from STMicroelectronics of Phoenix, Ariz. Input terminal 306 is the source of the FET 302; output terminal 308 is the drain of the FET 302 and control terminal 310 is the gate of the FET 302. Input terminal 306 is connected to output path 104a. Output terminal 308 is connected to common bus 108. Control terminal 310 is associated with the output of the control element 304.

Control element 304 measures a voltage difference between output path 104a and common bus 108 and hence the voltage difference can be used to indicate current flowing between output path 104a and common bus 108. Control element 304 adjusts the resistance of resistive element 302 based on the magnitude and direction of the current derived from the voltage difference. Adjustment of the resistance is achieved by generating a control signal which is provided to control terminal 310 of resistive element 302. In the embodiment, the substantive control signal generated by control element 304 is provided to intermediary circuit 312 which generates a modified, amplified control signal. It will be appreciated that the intermediary circuit 312 may be by-passed with the output of control element 304 provided directly to control terminal 310. Further detail on control element 304 is provided later.

Following is a description of the operation of resistive element 302, as a FET 302, in the embodiment.

Figure 5:
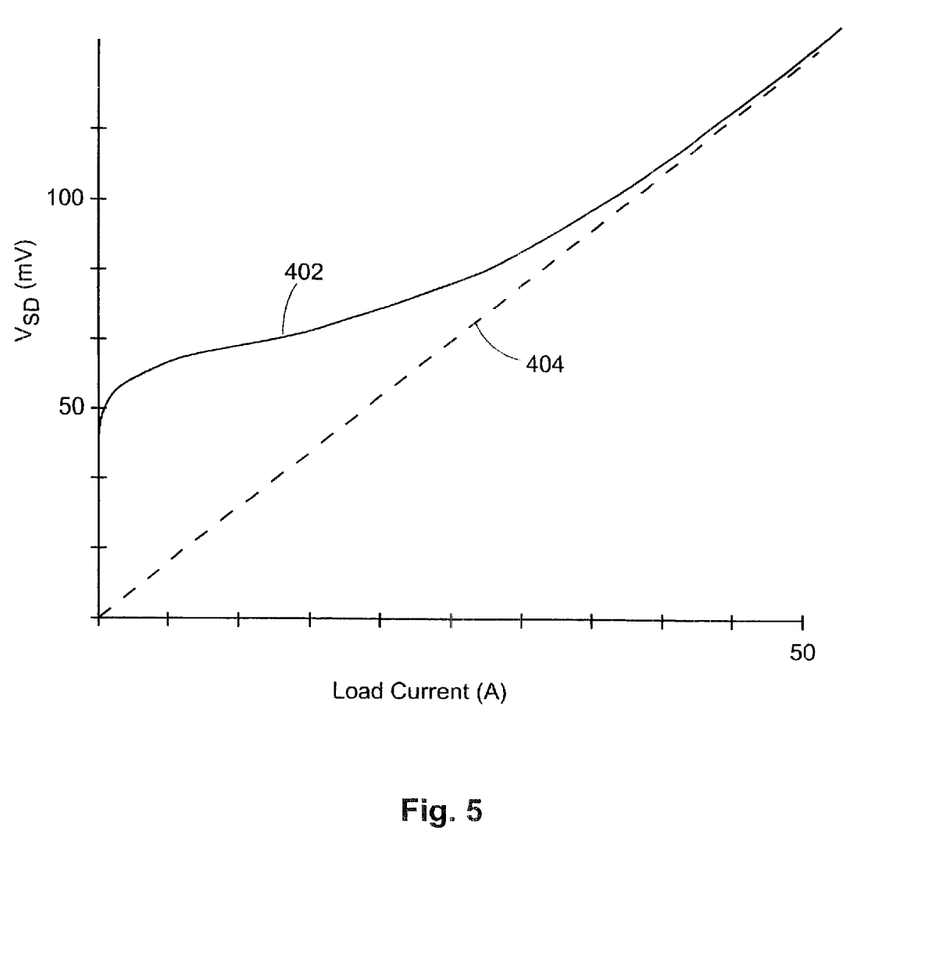
FIG. 5 is a voltage to current diagram of voltage output characteristics of the FET in the control circuit of FIG. 4 compared with a prior art system.

Referring to FIG. 5, solid curve 402 shows the magnitude of the voltage drop across resistive element 302, i.e. between nodes 104a and 108, as a function of current flowing through resistive element 302. As described earlier, to provide comparable functionality as diode 106, prior art systems operated a FET in either the cut-off or saturated states. Dashed curve 404 shows the behaviour of resistive element 302 when operated as a saturated switch.

Curves 402 and 404 may converge at a high load current, i.e. control element 304 may be designed to provide sufficient gain to saturate FET 302 in the region of maximum desired output current.

As stated earlier, $V_{sd}$ may be used to indicate the magnitude and direction of current flowing between the local power supply and the common bus.

However, there are disadvantages to using $V_{sd}$ as an indication of the magnitude and direction of current in a "switched" FET. Aspect of some disadvantages are illustrated in curve 404. As its output current approaches zero, the voltage drop across the FET ($V_{sd}$) also approaches zero. The difference between a small positive current and a small, but rapidly increasing, negative current may be a very few millivolts; a controller must quickly identify and react to power conditions based on small value signals.

Accordingly, to improve resolution of smaller output currents and decrease response time of the FET 302, circuit 201a operates FET 302 essentially in its linear region. FET 302 effectively operates as a variable current-sense resistor. By driving FET 302 in the linear region, with $V_{gs}$ proportional to $V_{sd}$, the gate drive voltage is continually adjusted to maintain approximately the same voltage across FET 302. Accordingly, as the positive output current approaches 0 amps (due to either a voltage drop from power supply 102a or a voltage increase on common bus 108), the gate drive voltage drops and FET resistance climbs. In the embodiment, a 50:1 change in load current results in less than a 3:1 variation in $V_{sd}$; a saturated FET operated over the same load range would experience roughly a 50:1 $V_{sd}$ variation.

It will be appreciated that the reduction in voltage swing across the linear versus "switched" FET during large dynamic load shifts provides improved dynamic load regulation.

The embodiment provides improved response characteristics over the prior art when detecting load currents near 0 amps. This is a critical operating region, since in a fault condition, net output current from the power supply may fall towards zero, then become negative and flow into the power supply, within microseconds.

Further, the gate bias of FET 302 automatically drops towards the threshold voltage as the forward current through FET 302 decreases. Accordingly, less energy and time is required to completely drive FET 302 into cut-off than if the FET gate had been biased in a "switching" manner.

Referring to FIG. 4, FET 302 has an intrinsic body diode 314 which notionally is represented as a diode in parallel to the conductive channel between the source and the drain. Due to the existence of diode 314, FET 302 must be connected to output bus 104a and common bus 108 in such a manner so that diode 314 opposes reverse current flow. Body diode 314 ensures that forward current will always pass through FET 302; should the FET be biased in its cut-off region, current will still conduct through body diode 314, though with a large voltage drop. The reverse leakage current through a cut-off FET 302, inclusive of its body diode 314, can be orders of magnitude lower than that achieved by the best low-drop Schottky OR-ing diodes (as might be used as diode 106 in FIG. 1).

Following is a description of the control means of the resistive element 302 of the first embodiment.

Control element 304 provides the substantive control signal for control terminal 310 of FET 302. In the embodiment, control element 304 is a commercially available operational amplifier ("op-amp"), such as component MC34072, available from ON Semiconductor of Arizona. This op-amp has a moderately fast slew rate of approximately 13 volts/μs, which assists driving FET 302 quickly into cut-off.

In the embodiment, op-amp 304 and its surrounding circuit are configured to operate as a differential voltage amplifier; the voltage on output path 104a is compared with a voltage on common bus 108. Accordingly, positive input terminal 316 of op-amp 304 is connected to output path 104a through resistor 318, which has a value of 1 kohm. Negative input terminal 320 of op-amp 304 is connected to common bus 108 through resistor 322, which has a value of 1 kohm. In the embodiment, the voltage signals on output path 104a and common bus 108 are taken across FET 302. To reduce parasitic effects of other signals in signal tracks, the voltage signals may be taken as close to the respective terminals of FET 302 as possible. However, it will be appreciated that in another embodiment, parasitic resistances surrounding FET 302 may be incorporated into the measurement of the voltage signals. In such another embodiment, the output aspects of op-amp 304 may be modified to incorporate such parasitic signal values.

To complete the differential voltage amplifier, a feedback loop is provided from the output terminal of op-amp 304 to the negative input terminal 320 through resistor 324. The gain for the output of op-amp 304 is provided by the ratio of resistor 324 over resistor 322, as referenced to source terminal 306. In the embodiment resistor 324 is 60 kohms, therefore a gain is provided at the output of op-amp 304 having a factor of 60 times, as referenced to source terminal 306. Accordingly, the output of op-amp 304 provides a control signal that is a multiple of the voltage drop across the source and drain of FET 302. Relating the output signal of control element 204 (FIG. 3) to this embodiment, this embodiment provides K with a value of 60.

Circuit 201a has the negative power rail of op-amp 304 referenced to system ground and not to terminal 306 of FET 302. It will be appreciated that other reference points for op-amp 304 and other values for resistors 318, 322 and 324 may be provided to alter the operating parameters of op-amp 304 to suit different implementation requirements.

Further, it will be appreciated that other passive or reactive elements may be associated with op-amp 304 in order to alter timing characteristics of the output signal. For example, a reactive element such as optional capacitor 326 (shown in dashed lines), when connected in parallel across resistor 324, would lower the high frequency transient gain of op-amp 304; a capacitor placed in parallel with resistor 322 would have the opposite effect. Other reactive elements may be implemented around op-amp 304 as required to modify the frequency response of the output signal; such techniques and circuits are known in the art.

Noise transmitted through op-amp 304 through its power pins should be decoupled. Accordingly, resistor 328 and capacitor 330 are connected to the $V_{pos}$ terminal of op-amp 304. The anterior terminal of capacitor 330 is connected to power return while the posterior terminal of resistor 328 is connected to power, as provided by $V_{cc}$; $V_{neg}$ terminal of op-amp 304 may be connected to power return. In the embodiment, resistor 328 has a value of 10 ohms, and capacitor 330 has a value of 1.0 μF. Other values and circuit arrangements may be utilized to decouple op-amp 304 from noise.

Accordingly, op-amp 304 and FET 302 operate as follows in response to various currents through FET 302. First, any change in power supply 102a or system load 110 that demands an increased current through FET 302 will increase the $R_{ds-on}$ voltage drop across its source to drain. The $R_{ds-on}$ voltage increase will be amplified by control element 304 and the network of resistors 318, 322, and 324, as described earlier. Accordingly, the output of control element 304 produces an increased voltage at control terminal 310.

Subsequently, added bias on terminal 310 reduces the $R_{ds-on}$ and partially offsets the initial rise in voltage across the source-drain of FET 302. Accordingly, the negative feedback loop adaptively adjusts the gate drive at terminal 310 such that the voltage drop across FET 302 remains relatively constant over a wide load range. Ultimately there is a limit to how low the $R_{ds-on}$ of FET 302 can be driven in response to a control signal on terminal 310. If enough gain is provided by control element 304 and if a $V_{cc}$ exists which is sufficiently above the voltage at node 104a, then there will be a level of load current which would saturate FET 302. For load increases above this point, the negative feedback loop is no longer effective, and $V_{sd}$ rises in direct proportion to $I_{sd}$.

Further, any change in power supply 102a or system load 110 that demands a decreased current through FET 302 will decrease the $R_{ds-on}$ voltage drop. Through the negative feedback mechanism and gain of control element 304 discussed above, the gate drive voltage at terminal 310 will be adaptively lowered such that the voltage drop across FET 302 remains relatively constant over a wide range of voltages. Again, a limit will be reached, though at this point the $R_{ds-on}$ has climbed sufficiently high to effectively represent an open circuit ($V_{gs}$ has dropped to below the threshold voltage for the gate of FET 302). Should the voltage on the drain of FET 302 actually rise above that on its source, i.e. voltage at node 108 exceeds the voltage at node 104a, control element 304 will drive FET 302 deeper into cut-off. No significant reverse current will flow through either FET 302 or its reverse biased body diode 314.

As noted above, in the embodiment, the output from op-amp 304 is not provided directly to gate 310. Instead, the output of op-amp 304 is provided to intermediary circuit 312, which amplifies the current driving capability of op-amp 304. This modified control output signal is provided to gate 310. Intermediary circuit 312 comprises staged transistors 334 and 336 in a push-pull emitter-follower configuration. In the embodiment, transistors 334 and 336 are bipolar junction transistors ("BJT"); in particular, transistor 334 is a NPN BJT, such as the ZTX651, available from Zetex PLC of England, and 336 is a PNP BJT, such as the ZTX751 from Zetex. The output of op-amp 304 is fed to the bases of transistors 334 and 336 and the emitters of 334 and 336 are connected to gate terminal 310. The collector of transistor 334 is connected to $V_{cc}$ through a noise filter composed of resistor 340 and capacitor 342. The posterior terminal of resistor 340 is connected to $V_{cc}$ and the anterior end of capacitor 342 is connected to ground. Resistor 338 is connected between the output of op-amp 304 and gate terminal 310 to force DC errors across intermediary circuit 312 to zero. In this embodiment, resistor 340 has a value of 10 ohms, resistor 338 has a value of 1 kohm and capacitor 342 has a value of 1.0 µF.

An aspect of the embodiment relating to component failure is now described. If control element 304 fails to properly enhance FET 302, the resulting heat generated by forward output current flowing through body diode 314 may overheat and destroy the part. Accordingly, thermal protection circuit 332 may be provided to monitor the operating temperature of FET 302. It will be appreciated that thermal circuit 332 may take various forms known in the art, including a thermal sensor that causes a shutdown latch to turn off power supply 102a should FET 302 get excessively hot.

It will be appreciated that circuit 201a enables its associated power supply 102a to be "hot-swapped" onto common bus 108, as circuit 201a can electrically isolate power supply 102a from common bus 108 as power supply 102a is connected to power system 200.

Figure 6:
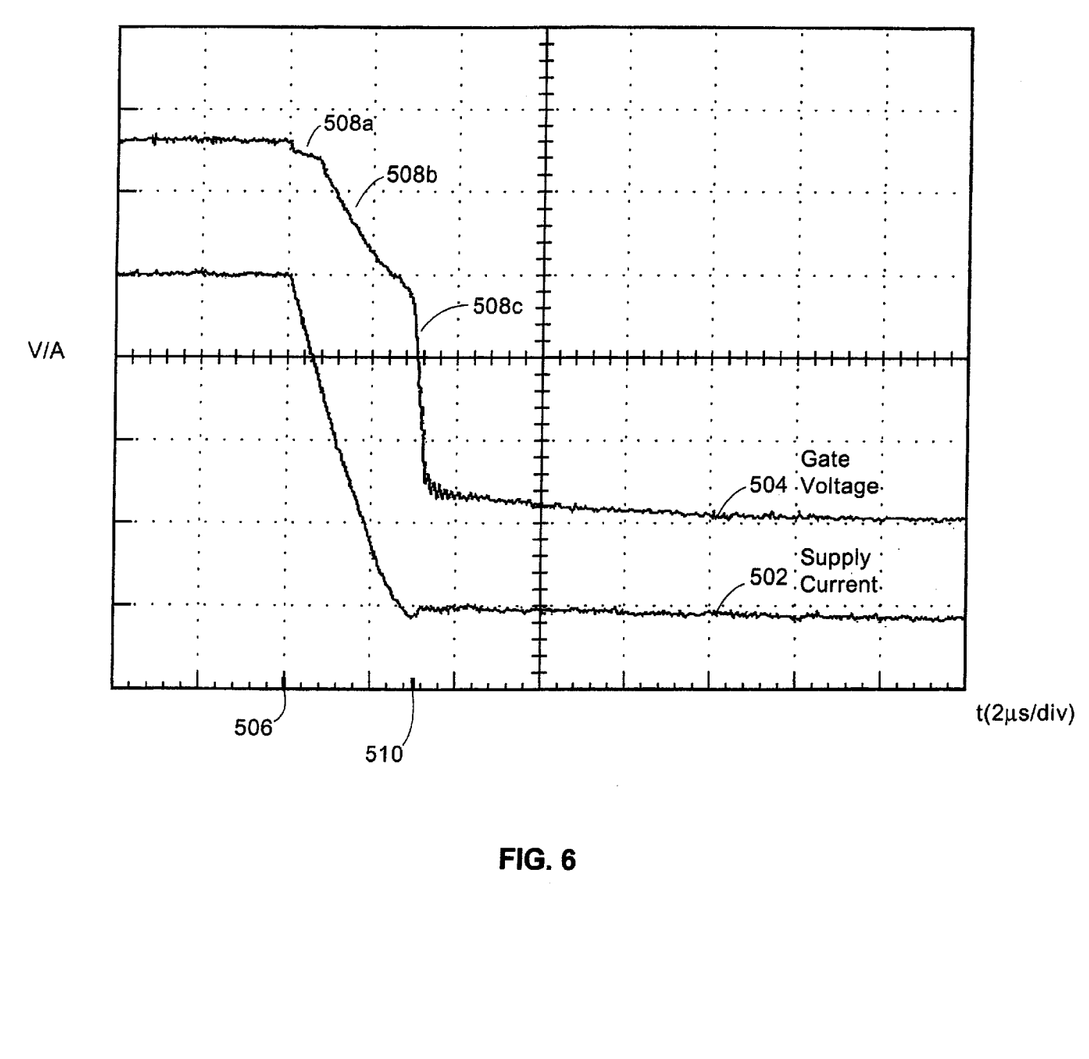
FIG. 6 is a voltage to time diagram of a drive voltage at a gate associated with the FET and a current to time diagram of current through the FET in the control circuit of FIG. 4.

Referring to FIG. 6, a response timing diagram of FET 302 in the embodiment of FIG. 4 is shown, with the x-axis representing time at 2 µs/division, and the y-axis representing voltage and current. Curve 502 represents $I_{sd}$ through FET 302, with a scale of 10 amps/division, while curve 504 represents the voltage at the gate terminal of FET 302, with a scale of 2 volts/division. At time 506 an event is simulated which causes current provided by power supply 102a to decrease; in this specific case, a "hard" short was placed across power supply output path 104a to power return. (Alternatively, power supply 102a may be functioning properly, but there may be an excessive voltage on common bus 108.) Accordingly, $I_{sd}$ begins to decrease. With the decrease of $I_{sd}$, the voltage drop across the $R_{ds-on}$ of FET 302 also drops, causing control element 304 to reduce the control signal applied to gate terminal 310; this corresponds to regions 508a and 508b of curve 504. $V_{gs}$ continues to drop as $I_{sd}$ drops, until time 510. At that time, forward current through FET 302 has effectively ceased, $R_{ds-on}$ of FET 302 has risen by several orders of magnitude and FET 302 is biased near its gate threshold voltage. Soon after the start of region 508c, drain terminal 308 of FET 302 becomes more positive than source terminal 306, control element 304 quickly drives gate terminal 310 deep into cut-off and no significant reverse current flows. The relatively slow decrease of $I_{sd}$ through regions 508a and 508b is due to parasitic inductance in the power path traces and wires, through the known equation:

$$V=L*(di/dt) \qquad \text{Equation 2}$$

This embodiment can drive FET 302 into cut-off in under 0.8 µs; different op-amps and different gains may provide faster or slower response times, as required.

It will be appreciated by those skilled in the art that other embodiments of circuit 201a may be provided wherein FET 302 is replaced with an alternative resistive element. For example, other three-terminal devices which may be used include P-channel MOSFETs, JFETs, BJTs, and IGBTs. It will be appreciated that these alternative devices will be controlled by an appropriate control circuit allowing them to operate in their respective linear regions.

It will also be appreciated by those skilled in the art that other embodiments may have functional aspects of op-amp 304, its surrounding circuit, intermediary circuit 312 and FET 302 combined into hybrid element(s), such as in an appropriate ASIC.

It will further be appreciated that an embodiment may be used in other power supply systems providing negative voltages to other loads. In that embodiment, a version of circuit 201a and suitable orientation for resistive element 302 may be used to provide blocking of current flowing into its local power supply and operation of the resistive element in its linear region. In that embodiment, it will be appreciated that for the resistive element, when comparing the voltage at the input terminal against the voltage at the output terminal, the absolute values of the voltages are compared. Accordingly, a voltage at the input terminal is "smaller" than a voltage at the output terminal when the input voltage is closer to 0.

Figure 7:
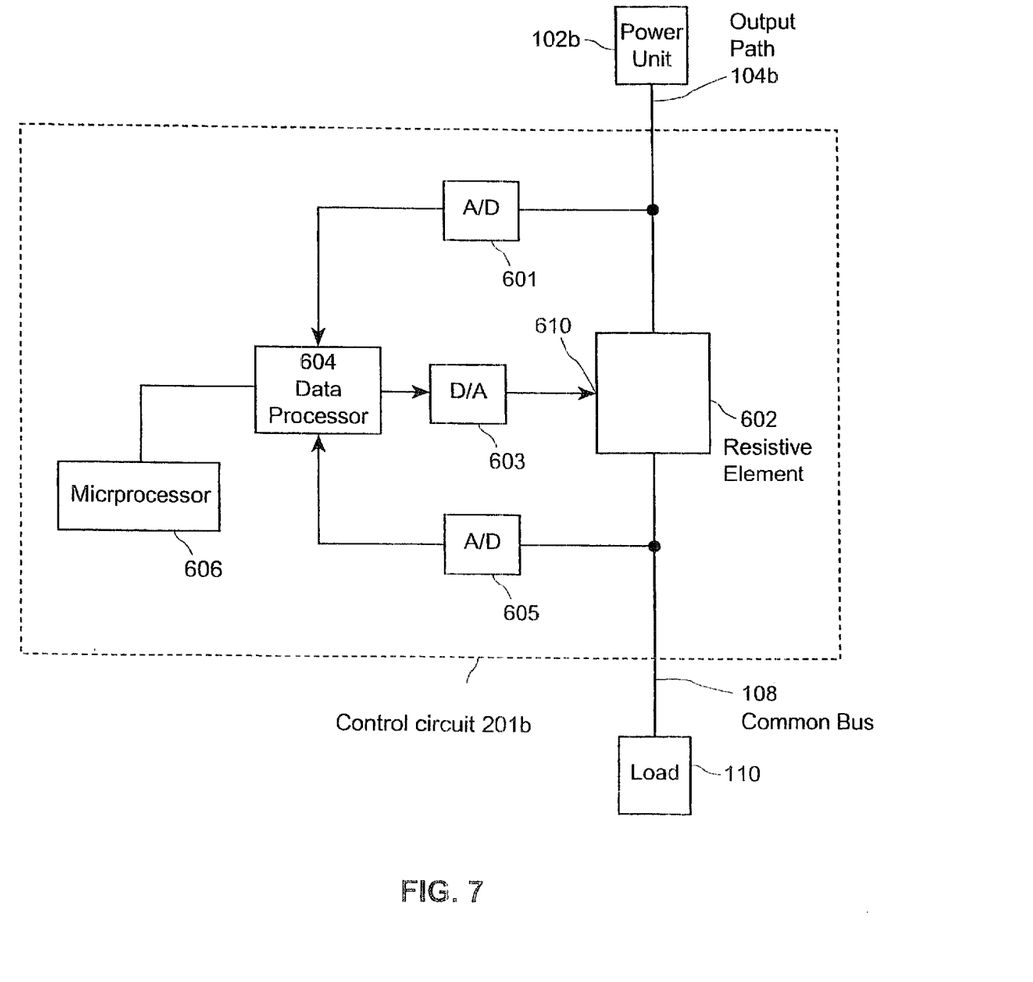
FIG. 7 is a block diagram of another control circuit utilizing digital control signals of the second embodiment shown in FIG. 2.

Referring to FIGS. 2 and 7, the following is a description of control circuit 201b of the second embodiment of control circuit 201. Control circuit 201b senses voltages about a resistive element at node 104b and at node 108, digitizes the voltages, calculates required difference and gain functions in the digital domain (including any expansion/compression/frequency dependencies or offsets), and converts the digital output to an appropriate analog signal. The analog signal is provided to control terminal 610 of the resistive element 602 (corresponding to element 202 of FIG. 3).

Referring to FIG. 7, modules 601 and 605 are analog to digital converters that digitize voltages at nodes 104b and 108, respectively. Module 604 (corresponding to element 204 of FIG. 3) performs digital domain processing of digitized samples of the voltages and may be a microcontroller, a microprocessor, or a device controlled by separate microprocessor 606.

Module 603 is a digital to analog converter, which translates the control signal generated by control element 604 into an appropriate analog signal for control terminal 610 of linear resistive element 602. Intermediary circuits, such as circuit 312 of FIG. 4, are not shown, although they may be provided.

A key requirement of resistive element 602 is that it can provide a linear output in a similar manner as when FET 302 operates in linear region 402.

It will be appreciated that some or all of modules 601, 603, 604, 605 and 606 may be implemented into a single module. It will be further appreciated that an embodiment may utilize a combination of digital and analog signals and devices to provide a control system providing the functionality as described above.

It is noted that those skilled in the art will appreciate that various modifications of detail may be made to the preferred embodiments described herein, which would come within the scope of the invention as defined in the following claims.

I claim:

1. A control system for selectively isolating a power supply from a common bus upon detection of an improper current flow between said common bus and said power supply, said control system comprising:

a resistive element providing variable resistance between an input terminal and an output terminal, said variable resistance having one of at least three resistive values, said input terminal connected to an output path of an output signal of said power supply, said output terminal connected to said common bus, said resistive element further comprising a control terminal enabling adjustment of said variable resistance; and a control element providing a control signal to said control terminal, said control element being responsive to a value of a current flowing between said output path and said common bus, wherein said control element generates said control signal to cause said variable resistance to be set at one resistive value of said at least three resistive values to impede flow of said current, depending on said value of said current.

2. The control system for selectively isolating a power supply from a common bus, as claimed in claim 1, wherein said control element utilizes a first voltage signal associated with said input terminal and a second voltage signal associated with said output terminal in providing said control signal.

3. The control system for selectively isolating a power supply from a common bus, as claimed in claim 2, wherein said resistive element blocks said current flowing from said common bus to said output path.

4. The control system for selectively isolating a power supply from a common bus, as claimed in claim 3, wherein said resistive element is a FET controlled by said control element to operate in a linear region when said current is both flowing from said output path to said common bus and decreasing.

5. The control system for selectively isolating a power supply from a common bus, as claimed in claim 4, wherein said control element adjusts said control signal to increase said variable resistance, if possible, when there is a decrease in said current flowing from said output path to said common bus.

6. The control system for selectively isolating a power supply from a common bus, as claimed in claim 5, wherein said control element adjusts said control signal to decrease said variable resistance, if possible, when there is an increase in said current flowing from said output path to said common bus.

7. The control system for selectively isolating a power supply from a common bus, as claimed in claim 6, wherein said control element adjusts said control signal to operate said FET in a cut-off region when said first voltage is smaller than said second voltage.

8. The control system for selectively isolating a power supply from a common bus, as claimed in claim 4, wherein said control element is an operational amplifier.

9. The control system for selectively isolating a power supply from a common bus, as claimed in claim 8, wherein said control signal is amplified by an intermediary circuit located between said operational amplifier and said control terminal.

10. The control system for selectively isolating a power supply from a common bus, as claimed in claim 3, wherein said resistive element is selected from a group comprising a MOSFET, a BJT, a JFET and an IGBT.

11. The control system for selectively isolating a power supply from a common bus, to claimed in claim 10, wherein said control element is an operational amplifier;

said operational amplifier adjusts said control signal to increase said variable resistance, if possible, when said current flows from said output path to said common bus and said current decreases;

said operational amplifier adjusts said control signal to decrease said variable resistance, if possible, when said current flows from said output path to said common bus and said current increases; and said operational amplifier adjusts said control signal to operate said resistive element in a cut-off region when said first voltage is smaller than said second voltage.

12. The control system for selectively isolating a power supply from a common bus, as claimed in claim 11, wherein said operational amplifier utilizes a first voltage signal from said output path and a second voltage signal from said common bus to generate said control signal.

13. The control system for selectively isolating a power supply from a common bus, as claimed in claim 12, wherein said control system further comprises a thermal protection circuit associated with said resistive element, said thermal protection circuit detecting when excessive heat is generated by said resistive element and then controlling said power supply to reduce said excessive heat.

14. The control system for selectively isolating a power supply from a common bus, as claimed in claim 13, wherein said thermal protection circuit comprises a thermal sensor and a shutdown latch.

15. A power supply system for use with a common bus providing power to a load, said power supply system comprising:

a power supply producing an output signal on an output path;

a resistive element providing a variable resistance between an input terminal and an output terminal, said variable resistance having at least three resistance values, said input terminal connected to said output path, said output terminal connected to said common bus, said resistive element further comprising a control terminal enabling adjustment of said variable resistance; and a control element providing a control signal to said control terminal, said control element being responsive to a current flowing between said output path and said common bus.

16. The power supply system for use with a common bus providing power to a load, as claimed in claim 15, wherein:

said resistive element is selected from a group comprising a MOSFET, a BJT, a JFET and an IGBT; and said control element is an operational amplifier, said operational amplifier utilizing a first voltage signal associated with said input terminal and a second voltage signal associated with said output terminal in providing said control signal, said control signal being a function of said first voltage signal and said second voltage signal, said operational amplifier adjusting said control signal to increase said variable resistance, if possible, when said current flows from said output path to said common bus and said current decreases, said operational amplifier adjusting said control signal to decrease said variable resistance, if possible, when said current flows from said output path to said common bus and said current increases, and said operational amplifier adjusting said control signal to operate said resistive element in a cut-off region when said first voltage is smaller than said second voltage.

17. A method for selectively isolating a power supply from a common bus, said method comprising:

determining direction and magnitude of current flowing between an output path of said power supply and said common bus;

increasing a resistance value of a resistive element located between said output path and said common bus, if possible, when said current flows from said output path to said common bus and said current decreases;

decreasing said resistance value, if possible, when said current flows from said output path and said current increases; and blocking said current from flowing from said common bus to said output path, wherein said resistance value of said resistive element is selected from one resistance value of at least three resistance values.

18. The method for selectively isolating a power supply from a common bus, as claimed in claim 17, wherein said resistive element is a selected from a group comprising a MOSFET, BJT, a JFET, and an IGBT; and said resistive element operates in a linear region when said current flows from said output path to said common bus and said current is decreasing.

* * * * *

UNITED STATES PATENT AND TRADEMARK OFFICE
CERTIFICATE OF CORRECTION

PATENT NO. : 6,653,748 B2
DATED : November 25, 2003
INVENTOR(S) : Marlowe James Buchanan It is certified that error appears in the above-identified patent and that said Letters Patent is hereby corrected as shown below:

<u>Title page,</u>
Item [73], Assignee, "Lacteal Canada Inc., Kanaka (CA)" should read -- Celestial International Inc., Toronto, Canada --.

Signed and Sealed this

Eighth Day of June, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,653,748 B2
DATED : November 25, 2003
INVENTOR(S) : Marlowe James Buchanan It is certified that error appears in the above-identified patent and that said Letters Patent is hereby corrected as shown below:

<u>Title page,</u>
Item [73], Assignee, "Alcatel Canada Inc., Kanata (CA)" should read -- Celestica International Inc., Toronto, Canada --.

Signed and Sealed this

Thirty-first Day of August, 2004

JON W. DUDAS
*Director of the United States Patent and Trademark Office*